(12) United States Patent
Cui et al.

(10) Patent No.: US 12,213,034 B2
(45) Date of Patent: Jan. 28, 2025

(54) INTELLIGENT SECURITY VIA ACCURATE MOBILE DEVICE LOCATION SENSING

(71) Applicant: AT&T Intellectual Property I, L.P., Atlanta, GA (US)

(72) Inventors: Zhi Cui, Sugar Hill, GA (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 372 days.

(21) Appl. No.: 17/655,281

(22) Filed: Mar. 17, 2022

(65) Prior Publication Data

US 2023/0300577 A1    Sep. 21, 2023

(51) Int. Cl.
| | |
|---|---|
| H04W 4/029 | (2018.01) |
| G01S 5/00 | (2006.01) |
| H04W 4/02 | (2018.01) |
| H04W 4/33 | (2018.01) |
| H04W 68/00 | (2009.01) |

(52) U.S. Cl.
CPC ........... *H04W 4/33* (2018.02); *G01S 5/013* (2020.05); *G01S 5/016* (2020.05); *H04W 4/023* (2013.01); *H04W 4/029* (2018.02); *H04W 68/005* (2013.01)

(58) Field of Classification Search
CPC ........ G01S 5/013; G01S 5/016; H04W 4/023; H04W 4/029; H04W 4/33; H04W 68/005; H04W 4/021

USPC ......................................................... 455/466
See application file for complete search history.

(56) References Cited

U.S. PATENT DOCUMENTS

| | | | |
|---|---|---|---|
| 2013/0151506 A1* | 6/2013 | Dessouky | G06Q 30/02 707/719 |
| 2018/0234821 A1* | 8/2018 | Farley | H04W 4/023 |
| 2020/0019686 A1* | 1/2020 | Min | G01S 7/41 |
| 2021/0084436 A1* | 3/2021 | Sutherland | H04L 63/0853 |
| 2023/0138163 A1* | 5/2023 | Sivanesan | G08G 1/162 701/301 |

* cited by examiner

*Primary Examiner* — Hirdepal Singh

(57) ABSTRACT

Described is intelligent security based on the detection of the presence of mobile devices within a defined region, determined via accurate mobile device location sensing, e.g., within on the order of one meter. Upon detection of the presence of a mobile device within a defined region via mobile device millimeter wave-based position sensing, an identity associated with the mobile device is obtained. If the identity associated with the mobile device is not a trusted identity, action can be taken based on the presence of the identity within the defined region. The intelligent security can be implemented within an application program of a registered user's mobile device and/or a security system, such as a commercially available security system with alarm monitoring services. Various criteria can determine the action(s) to take, including by which region (if more than one), time of day, identity trust level, duration of presence, and the like.

20 Claims, 10 Drawing Sheets

INTELLIGENT SECURITY VIA ACCURATE MOBILE DEVICE LOCATION SENSING

TECHNICAL FIELD

The subject application relates to wireless communications systems in general, and more particularly to more accurate location sensing based on New Radio (NR) including fifth generation (5G) cellular wireless communications systems and/or other next generation networks.

BACKGROUND

In fifth generation (5G) wireless networks, new features are regularly being developed. According to standards of the third generation partnership project (3GPP) release 17, one such wireless network feature is positioning enhancements. These positioning enhancements, which can be based on millimeter wave-based position sensing, aim to improve the accuracy of mobile device (user equipment or UE) location from what is now on the order of 50 meters to on the order of 1.0 meter for commercial UE devices and less than 0.2 meters for industrial internet of things (IIoT) devices. As a result, services for various scenarios have been and can be developed based on such relatively highly accurate mobile device location sensing.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
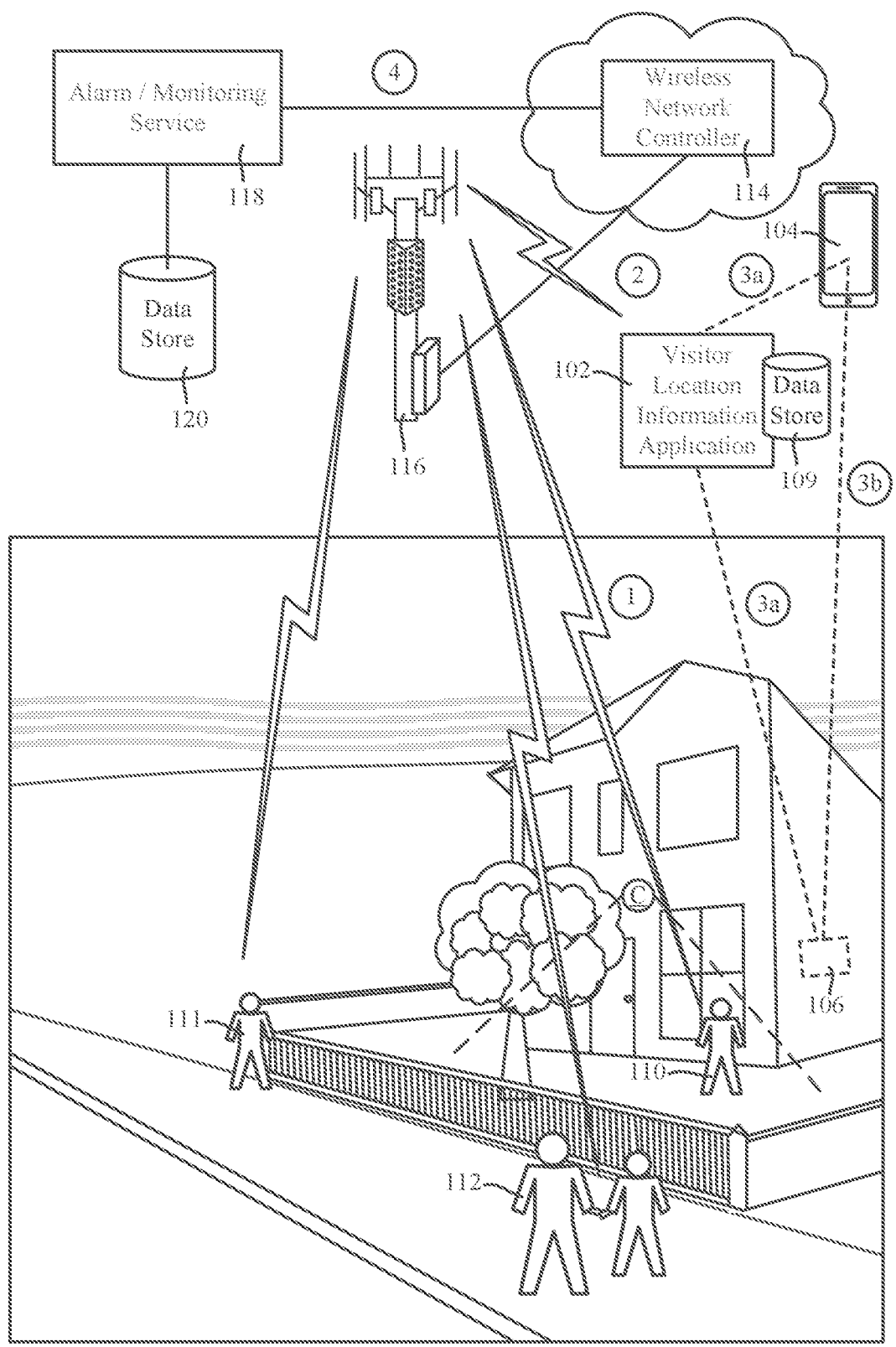
FIG. 1 is a block diagram illustrating an example network communication system in which accurate mobile device location sensing can detect a mobile device's proximity to a building, in accordance with various aspects and embodiments of the subject disclosure.

The technology described herein is generally directed towards a security system that is based on detecting the presence of mobile devices, to a high degree of location accuracy, within a defined region. For example, when a mobile device is detected as being within a user's property line boundaries, identity data associated with the mobile device (e.g., via the mobile device's phone number) is obtained. The identity data is evaluated against a list of known, trusted identities. Security-related action(s) can be taken if the identity data is not associated with a trusted identity.

The security-related actions can be based on a number of factors and conditions. For example, time of day, duration of an untrusted (including unknown) user's mobile device presence within a defined region, motion of the mobile device within the region, whether the identity is unknown versus known to be a likely undesirable trespasser, and so forth can be conditions that determine what action or actions are taken, e.g., as configured by a registered (e.g., owner) user. Example actions can be to log the event, send a notification to the registered user, send a camera feed to the registered user, communicate with another security system, sound an audible alert, notify authorities, and so forth.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNodeB (gNB)," "evolved Node B (eNodeB)," "home NodeB (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example system 100 of FIG. 1, a network-based visitor location information application program 102 is installed on a registered (e.g., owner or other authorized entity such as a renter, adult child or the like, or possibly a group such as a husband and wife, or family) user's smart device 104 and/or home security control panel 106. A data store 109, incorporated into or closely coupled to the visitor location information application program 102, e.g., on the device 104 and/or the home security control panel 106.

The data store 109 can include a programmable whitelist, and possibly a blacklist, can be input to or self-learned by the user's visitor location information application program 102. The whitelist identifies friends and family members and any otherwise welcome, expected visitors (e.g., a housekeeper, pet sitter and the like). The blacklist, if present, can help identify a person with a mobile device who is specifically not welcomed (e.g., an ex-spouse, ex-boyfriend or ex-girlfriend, a person known from a criminal list, if available, someone on whom a restraining order has been placed by the registered user or family member, and the like). Unknown persons are those who are not on identified in the data store 109.

As users 110-112 with mobile devices (not explicitly shown) move about, millimeter wave-based position sensing of a wireless network controller 114 coupled to wireless network antennas 114 can detect each device's location and motion, which as set forth herein, can be on the order of one meter. For a mobile device sensed (circled numeral one (1)) within a defined zone boundary associated with an registered user, e.g., a mobile device held by the user 109, the wireless network controller 114 can signal the registered user's visitor location information application program 102 with the mobile device's location and identity data (e.g., phone number or international mobile equipment identity) associated with the mobile device. For example, the registered user can subscribe to such a security service offered by the wireless carrier, or an alarm system company (e.g., an alarm/monitoring service 118) that can obtain such information.

In the example of FIG. 1, a mobile device of the user 110 triggers sending the mobile device's (of the user 110) identity data to the visitor location information application program 102 (circled numeral two 2)). The application program 102 evaluates the identity data against the entries in the data store 109. If the user is a trusted identity, no further action is needed, although it is feasible to send a notification or log the event in such a trusted identity scenario.

If the identity data does not match a trusted identity further action can be taken. This can be to activate/steer a camera C (or multiple cameras), which can include starting a video recording, uploading the video frames to the user device or the alarm/monitoring service 118, which may maintain its own data store 120. For example, facial recognition can be performed to match the user 110 with a known identity. As an example, consider that the user 110 is authorized to be on the property but for some reason is without his mobile device, and a friend's mobile device, not on the whitelist, is being detected; facial recognition can recognize a trusted person as a secondary check.

Note that there can be different levels of trust. For example, at a certain time of day a house cleaner is trusted if detected on Fridays before 6 pm, but not on other days or after normal hours. The region may also be a factor, such as a landscaping service allowed to be on the property on Wednesday mornings or afternoons, but not inside the registered user's home. Such trust levels and conditions (e.g., times and days) can be set in the visitor location information application program 102.

If not trusted, the visitor location information application program 102 can interact (circled numerals 3*a* and 3*b*), with the security system 106 (circled numeral 3*a*), if present, and trigger a warning/alarm directly if the application program 102 is on the control panel 106. If the visitor location information application program 102 is only on the registered user's smart device 104, the smart device 104 can notify the security system 106, which can trigger a warning/alarm. This can be to the alarm/monitoring service 118 directly (e.g., via a wired phone or Wi-Fi internet connection) or via the wireless network controller 114.

The visitor location information application program 102 can also help make more optimal the communication between the security control panel and security server. For instance, the existing security system 106 can be set to communication efficient mode with less frequent or no information communication to reduce the amount of data exchange when everything is normal/back to normal. The application program 102 can configure more frequent communication when a visitor is detected/identified, or based on time of day or situational needs (e.g., programmed into an "away-on-vacation" mode.

Note that the control panel 106 need not be coupled to any monitoring service, but instead can sound an audible alert. The audible alert can be a more conventional alarm sound, barking dog sounds, a spoken warning "the police have been called" (even if not true) to scare off any possible intruder, and so forth.

Figure 2:
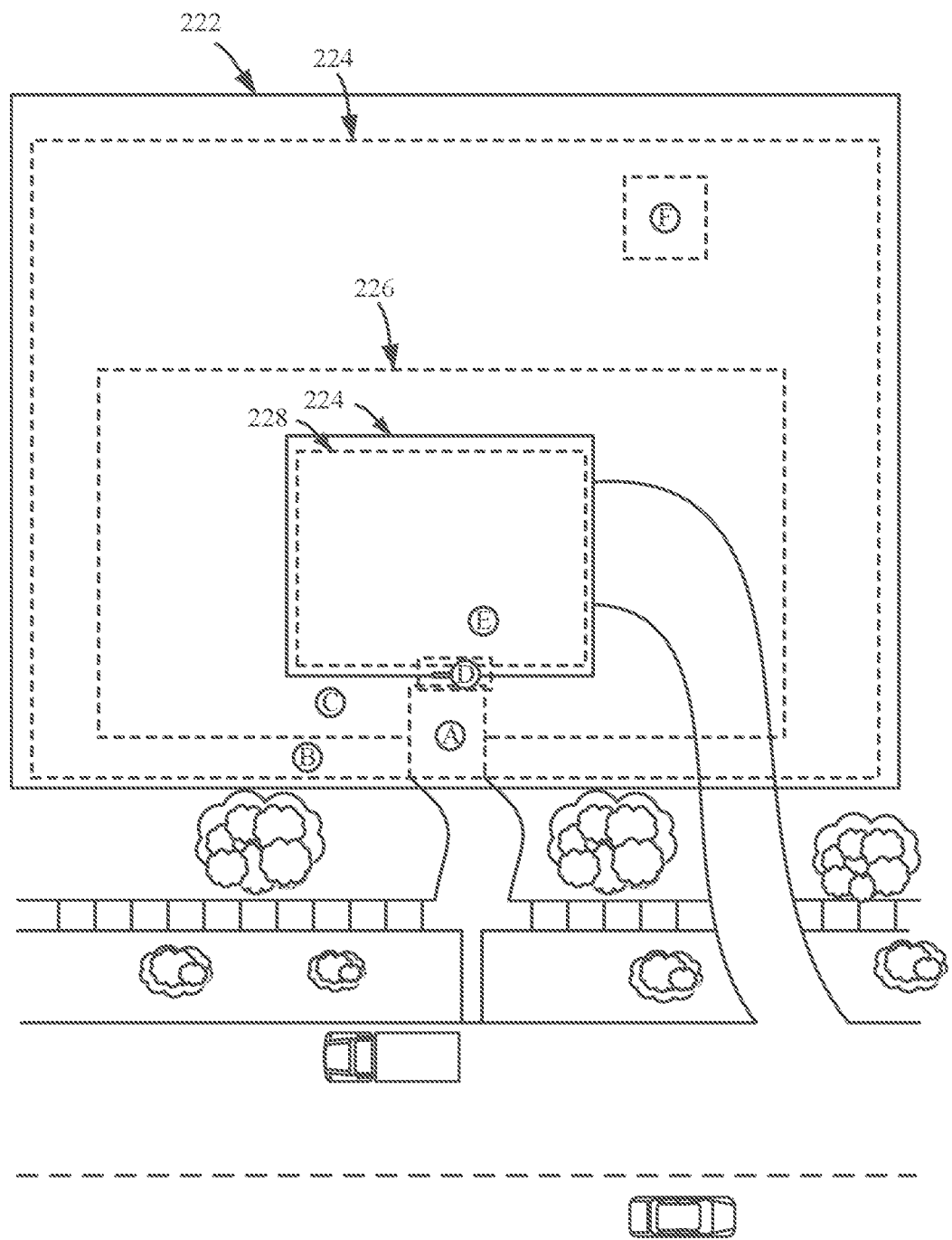
FIG. 2 is a top view of a structure in which various security zones (defined regions) have been established for triggering alerts based on the detected presence of mobile device(s) within the zones, in accordance with various aspects and embodiments of the subject disclosure.

Turning to FIG. 2, different boundaries/regions (including three-dimensional regions, such as in an apartment/condominium setting) can be established. For example, the registered user can activate a "boundary sensing mode" and then walk around his or her property to establish a zone; GPS as well as the highly accurate millimeter wave-based position sensing can be used to establish the boundaries. Similarly a house or apartment zone can be established. A user can also manually set the bounds.

In the example of FIG. 2, six two-dimensional zones A-F have been set up with respect to property lines 222 around a structure 224 (a home or other building, e.g., office building). These can be three-dimensional regions if elevation is taken into consideration, such as to say anything within forty feet above a two-dimensional zone is considered part of a defined region to be monitored.

The zone A allows access to the front door without necessarily triggering an alert. The zone B corresponds to just inside the property line 222 and can be used to the presence of a mobile device on the property. It should be noted that a restraining order against a person (or some similar circumstance) can be considered when defining a region; e.g., someone has been judicially ordered to stay at least 200 feet from the property, and thus a region can be defined to extend beyond a property boundary for certain person(s).

Another zone C in this example detects mobile devices that are proximate the structure 224, such as in an area 226 that is close enough able to indicate a mobile device of a user peering in a window. The (relatively very small) zone D detects a person at the front door; given that the location sensing is accurate to within a meter, a three-meter width by two-meter depth can be established, for example, for more certainty to avoid a false alarm situation in which a mobile device is outside the structure 224 but is sensed as being inside the structure 224.

The zone E in this example detects a mobile device within an area 228 corresponding to the interior of the structure 224. As is understood, an unknown (or known bad) identity with the zone E is likely more serious than a zone A or B presence. The zone F in this example may be a separate structure such as a shed or detached garage; the presence of mobile device with an unknown identity near or within zone F may indicate a person who is casing for or is actually breaking in (or already in) for the purpose of carrying out a burglary, for example.

The zones can be used to trigger an alert, as well as the severity of the alert, based on various factors, criteria and other state data. As one example, during the day it is common for delivery drivers to enter a user's property boundary to make a delivery. Thus, in such a situation, e.g., entry into the zone A, a minor action can be taken, such as to send a notification to the registered user, send a camera feed to the user, and so forth. However, a delivery driver typically does not linger in the same location, and thus the alert can be escalated in some way if a mobile device associated with an untrusted (including unknown) user is at the same location for too long. The delivery vehicle (e.g., of a well-known delivery service) can be analyzed/image recognized.

As another example, consider that a person with a location-sensed mobile device goes to the front door (e.g., is at the zone D), but does not ring the doorbell, (which can also be sensed). This may not be significant, e.g. the person may be putting a notice on the door handle, but can become suspicious if the person remains there for more than some short duration, e.g., thirty seconds. Such a person may be attempting to break in via the door. If however the doorbell is rung, a different duration can be used, as the person may be legitimately waiting for the door to be answered; notwithstanding a legitimate person will only wait so long, perhaps ringing the bell more than once, which can be used to reset or start a different duration timer.

Similarly, an unknown person with a sensed mobile device may be on the property, even within zone C in the example of FIG. 2, for a legitimate reason, but only briefly. Consider for example a soccer ball inadvertently kicked into zone C from a neighbor's property. Retrieving the ball may necessitate entering zone C, but only for a relatively short time.

Thus, duration data can be associated with each zone, possible in conjunction with doorbell or other sensing.

Another significant factor can be the time of day. A delivery truck under normal circumstances should not be arriving too late in the evening. For example, a registered user may set the system such that no untrusted identity should be anywhere on the property after 10 pm, unless accompanied by a trusted identity, e.g., at least a high percentage of the time. In this way a friend of the user's child who is sitting with the child in the backyard is distinguishable from a lone stranger or group of strangers. A registered user can temporally override setting data, e.g., if hosting a party or other group event on a given night when not every attendee's mobile device will be listed as trusted in the data store(s).

Thus, time data can be associated with each zone. In a similar way, higher levels of security can be associated with the defined zone or zones in a vacation mode setting when no untrusted person should be on the property for any significant (defined) duration, and especially no one that does not have a trusted identity is detected as moving within the structure 228 (zone E in the example of FIG. 2) or the like (zone F in the example of FIG. 2).

Figure 3:
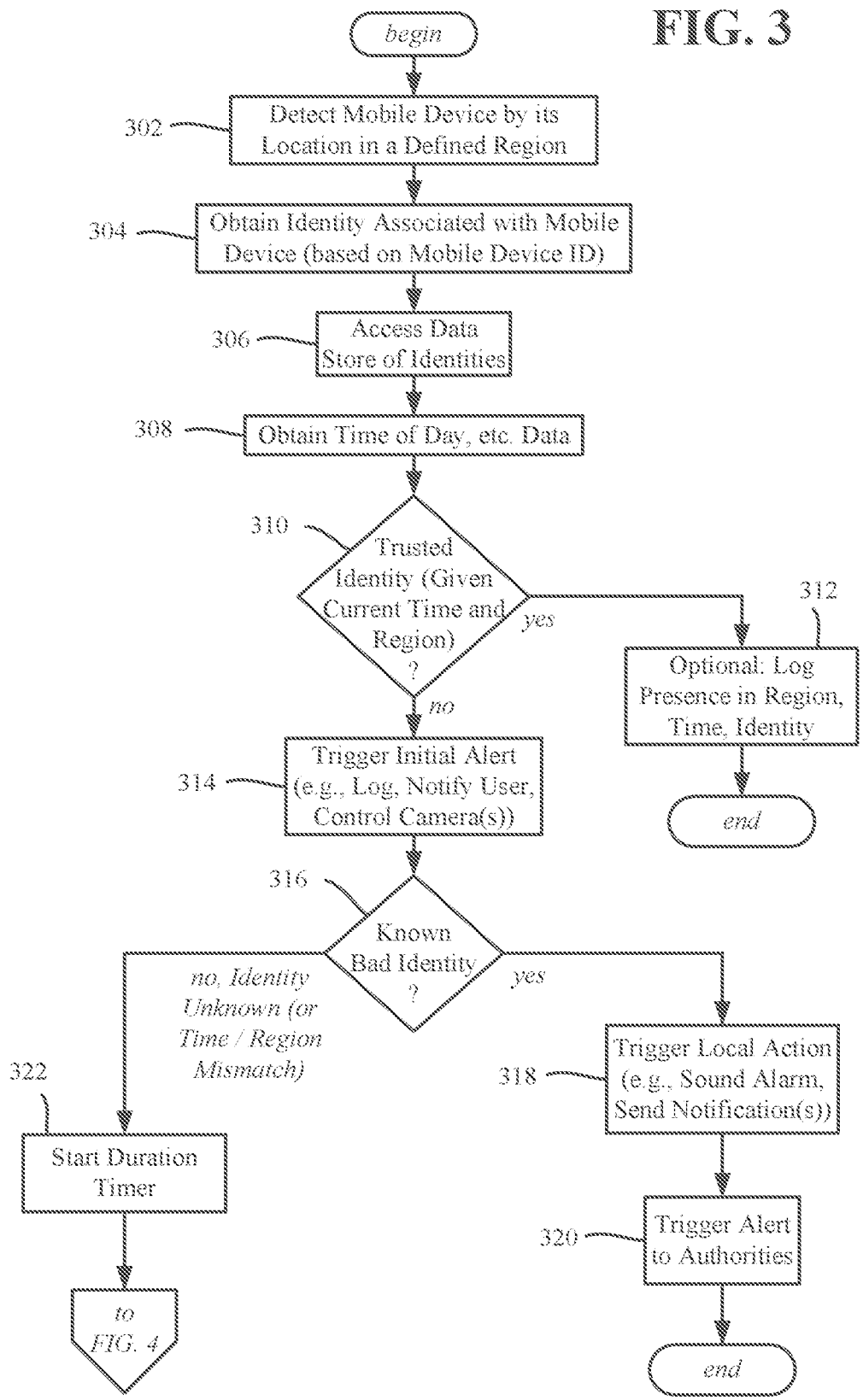
FIGS. 3 and 4 comprise a flow diagram illustrating example operations that can be performed with respect to taking actions upon detection of a mobile device within a defined region, in accordance with various aspects and embodiments of the subject disclosure.
Figure 4:
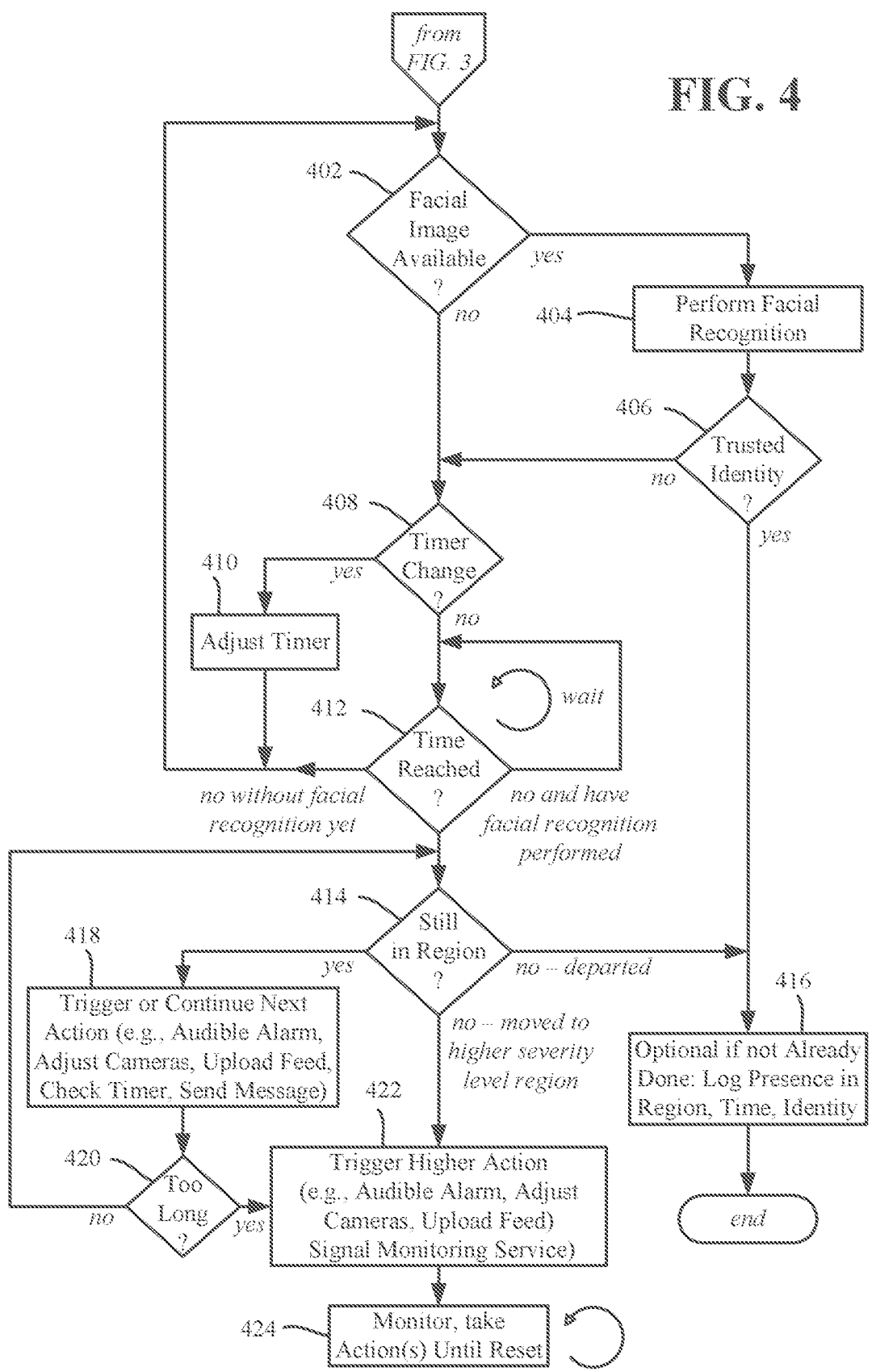

FIGS. 3 and 4 show example logic in which the operations show how some of the scenarios set forth above can be handled with respect to accurate location-based security as described herein, beginning at operation 302 where a mobile device is detected within a defined region. In the example of FIGS. 3 and 4, consider that there are two defined regions, such as one corresponding to a property boundary and a higher severity level region corresponding to inside a structure (with certain operations repeatable as needed for additional regions).

Operation 304 obtains the identity associated with the mobile device, and operation 304 accesses the data store of identities. Operation 308 obtains a timestamp for the current time (including the time of day and date data), unless already received as part of operation 304.

Operation 310 evaluates whether the identity belongs to a trusted identity. As described above, whether an identity is trusted can depend on the time and/or region, e.g., a housekeeper can be in the registered user's home within a certain time range but not at other times, a landscaping service can be within the property region on certain days but not inside the home region, and so on.

If the identity is trusted, operation 312 can be optionally performed, such as to log any relevant parts of the available information (e.g., timestamp, region, identity). Although not explicitly shown in FIG. 3, certain trusted identities can be logged while others are not, e.g., the timely housekeeper's visit is considered trusted but logged, while the identities and data of the registered user, spouse and their children are not logged.

Returning to operation 310, if the identity is not trusted, operation 314 triggers and initial alert, such as to log the event (time and region), control any camera(s), send a notification to the registered user and so forth. Note that for purposes of this example it is considered that at least one security camera is available; however most of the example operations do not involve a camera.

Operation 316 evaluates the data store for a known "bad" identity, someone who in general should not be in a defined region for any reason, such as the restraining order scenario described above. If there is a match, operation 318 triggers some local action, such as to sound an alarm, send an alert to the registered user's device, to the security system, and/or possibly to other identified users such as family members), possibly send another warning (an automated text message and/or phone call to the offending party's mobile device notifying them of their presence having been detected and surveilled). In this example, operation 320 directly (or indirectly via an alarm monitoring service) notifies authorities.

If not a known bad identity, operation 316 branches to operation 322 which starts a duration timer. Note that this branch is for other untrusted identities, such as that of an unknown person as well as for an identity of a person who is not considered currently trusted because of a current time and/or region mismatch. The example logic continues at operation 402 of FIG. 4.

Operation 402 evaluates whether a facial image (or facial images or more than one person) is available. If so, operation 404 performs facial recognition, and operation 406 determines whether the person recognized is a trusted person. Example operations 404 and 406 can handle, for example, a situation in which a trusted person has left his cell phone at the house and another person (with a mobile device having an untrusted identity) is with him or her to retrieve it, or if a trusted person is with his friend (whose device is not listed as trusted) but the trusted person's mobile device is dead or otherwise powered down. If an identity is trusted, operation 416 can be optionally performed, such as to log the relevant information, unless already logged (e.g., at operation 314 of FIG. 3), save the images (to later inquire about the unknown/untrusted person) and so forth.

If the identity is not trusted, either because facial recognition was not available at operation 402 (no face in the images, no camera captured that part of the region), or because no trusted identity was recognized at operation 406, operation 408 evaluates as to whether there is a reason to adjust the timer; if so, operation 410 adjusts the timer in some way, e.g., resets the timer, adds time to a duration limit, and so forth. Using an example from above, if the doorbell rings the timer can be adjusted based on the chance that the person who rang it is legitimately waiting for someone to answer. Another possibility is that a likely delivery driver went back to the delivery vehicle to get a second package and returned relatively quickly, before the system considered the untrusted identity to have left the region long enough to restart the operations from operation 302. Note that although not explicitly shown in FIG. 4, it is understood that the camera can capture and recognize certain types of delivery vehicles, which can be factored into the overall logic, e.g., more time for an identity before taking any significant action when a likely legitimate vehicle is recognized. The system can learn typical timing and other (e.g., motion) behaviors of doorbell ringers (e.g., solicitors or visitors), the typical behaviors of delivery drivers and so forth, and use this with respect to duration and/or motion evaluations. Artificial intelligence and/or machine learning can implement many of the operations/logical concepts described with reference to FIGS. 3 and 4.

Operation 412 waits for the appropriate time limit to be reached. This can be to return to operation 402 if no facial recognition was performed (including if prior facial recognition was not considered sufficiently reliable because of poor angles, lighting and the like), or simply to wait until the current duration deadline is reached, e.g., based on which region, any motion, time of day, and any other criteria including the example criteria set forth herein.

When the time limit is reached operation 414 evaluates whether the mobile device (associated with the untrusted identity) is still in the region. If not (and not moved to any other region), then the mobile device was not likely that of an unwanted intruder/trespasser, and the process performs only minor action(s), such as to log the event if not already logged. Note that although not explicitly shown in FIG. 4, motion can be considered at operation 414, in that a mobile device did exceed the likely acceptable duration, but clearly appears to be moving out of the region, whereby a small amount of extra time can be granted before making a decision on a next action.

In the event that the mobile device associated with the untrusted identity is still in the region, operation 418 performs a next, generally higher severity action, such as to sound an audible alert, adjust the camera or secondary cameras, upload the camera feed to ensure the event is being visually captured, check how long the mobile device has been in the region, and/or send an automated message to the mobile device to inquire as to what is going on. Operation 420 evaluates whether the mobile device is remaining there too long to be normal. If not, operation 420 returns to operation 414 to wait a while longer, given that any audible alarm, message or the like may have induced the person to begin leaving the region. If too long, then something is wrong, and the action(s) are escalated via operation 422 in this example. For example, the person may be unconscious, asleep or otherwise in medical distress at their location within the region. It is possible the mobile device has been left behind, which hopefully can be determined via camera(s), but if not needs to be considered as an issue needing to be handled.

Operation 422 represents triggering some higher action in this example, such as because operation 420 determined the mobile device was in a region for an abnormal amount of time, or because the mobile phone has moved to a higher severity region following operation 414, e.g., has moved from the larger property region and entered the defined region within the structure. This can be to sound an audible alarm (if not already sounded), sound a louder/different audible alarm, signal a monitoring service, directly notify authorities, and so on. Operation 424 continues the higher action until reset in some way, e.g., by an authorized deactivation code.

Although not explicitly shown in FIGS. 3 and 4, the sudden disappearance of a device from within a region without appropriate motion can be considered as a decision making factor. For example, consider that an intruder is waiting by the front door to see if anyone answers the doorbell, and if not, intends to break in. If an alarm sounds such as via operation 418, the intruder realizes that his or her presence has been detected, and can power off the mobile device to see if the mobile device was responsible for the detection. Simply assuming the person is gone in this situation, e.g., turning off the alarm, would be the opposite action to take. Thus, when a mobile device within a region vanishes too quickly, the mobile device can be considered still present in at least that region, with an alarm monitoring service notified or other escalated actions taken, e.g., as in the example of operation 422.

Another usage scenario is to set up a personal security zone, e.g., corresponding to a driving, jogging or other similar mode; there can be different trusted identities listed per mode. Note that driving and jogging motions can be sensed by mobile devices, and such a mode can be automatically activated. In such a mode, a mobile device of an untrusted user should not be too close to a registered user for too long, without at least notifying the registered user in some way to inquire if this is acceptable, e.g., driving with a coworker who is not listed as trusted with respect to such a mode. Such a zone can detect a carjacking scenario, for example, in which an unknown identity of a mobile device is staying within one meter of the registered user's mobile device while driving, and no response is returned.

Figure 5:
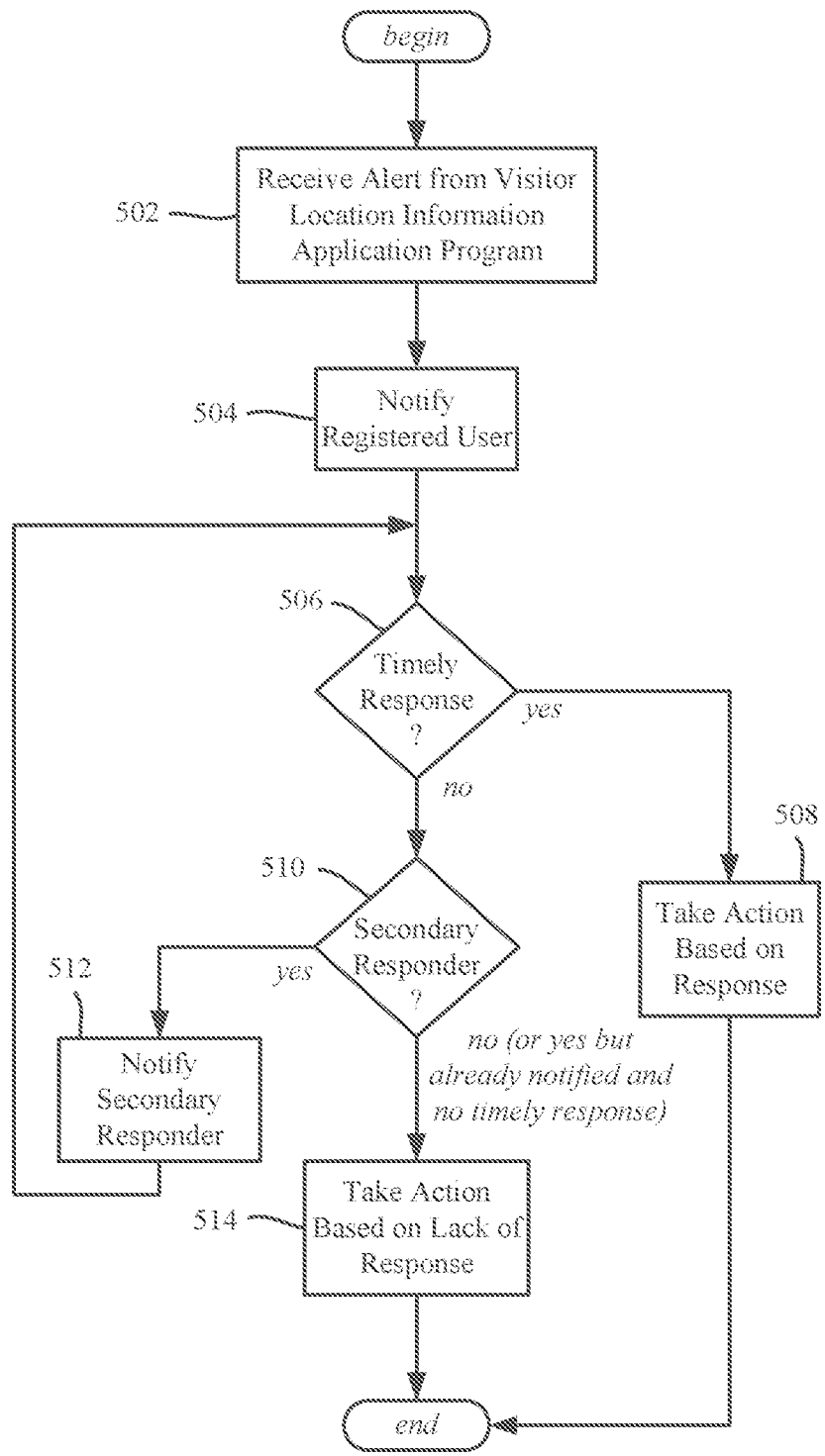
FIG. 5 is a flow diagram illustrating example operations that can be performed in response to receiving an alert of a mobile device within a defined region, in accordance with various aspects and embodiments of the subject disclosure.

FIG. 5 shows example operations that a security system or other program within a mobile device, or the visitor location information application program itself can take when an alert is triggered by/received from the visitor location information application program at operation 502. Operation 504 notifies the registered user, and operation 506 waits for a timely response, e.g., within some default time limit or user-configured time limit.

If there is a response from the registered user within the time limit, operation 508 acts on the response. The response, for example, may indicate to ignore the alert because the user recognizes from an image sent with the alert that the person/vehicle in the image is authorized to be there; for example, the landscaping service is there a day early because tomorrow is a holiday. The response can indicate to notify the monitoring service, sound an alarm, move up a security level, summon authorities and so on. Any of these actions can first depend on a second confirmation, such as to avoid taking an unintended action because the user mistakenly hit the wrong action button).

If there is no timely response, then there is a possibility that the registered user's mobile device has not received the alert, or that the user is unable to respond in time for whatever reason. For example, a device in airplane mode would not receive the alert, nor would a device not in range of a signal, or if powered off. In such a situation, the system/program can evaluate at operation 510 as to whether a secondary responder is registered to respond. For example, a spouse or responsible child can be designated as a secondary responder, and can thus submit the response on the registered user's behalf. If so, operation 512 notifies the secondary responder, and operation 506 awaits a timely response, (which can be a different time limit from that for the registered user).

If the secondary responder responds in time, operation 508 takes the action based on the response. Note that the secondary responder may not be given the same set of response options as given to the registered user.

If, once notified, the secondary responder also does not take timely action, (and the registered user also has still not responded within the secondary responder's time), operation 514 is performed to take an action based on the lack of a response. What action(s) to take in the event of a lack of a response can be user-configurable. As can be readily appreciated, there can be more than one secondary responder, and there can be a priority set among the registered user and/or the secondary responder(s) in the event multiple responses with conflicting actions to take are received within the secondary responder response time limit.

Figure 6:
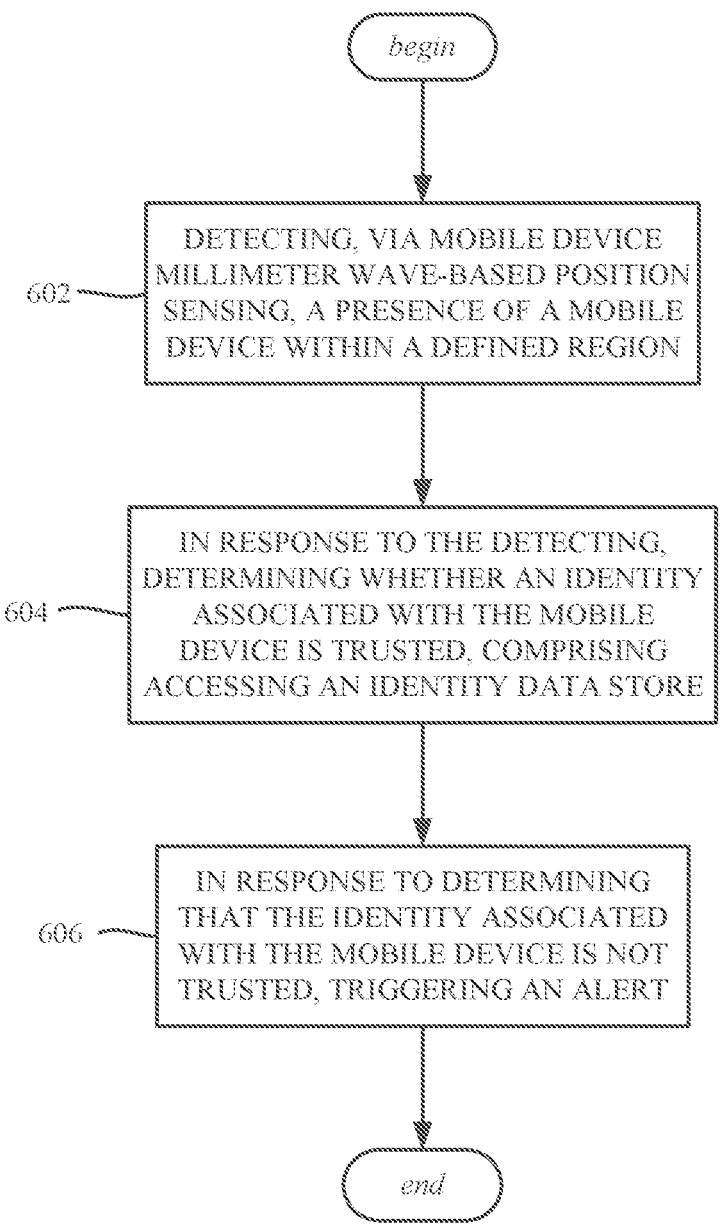
FIG. 6 illustrates example operations related to triggering an alert in response to determining that an identity associated with a mobile device detected within a region is not trusted, in accordance with various aspects and embodiments of the subject disclosure.

One or more example aspects are represented in FIG. 6, and can correspond to a system, comprising a processor, and a memory that stores executable instructions that, when executed by the processor of the system, facilitate performance of operations. Example operation 602 represents detecting, via mobile device millimeter wave-based position sensing, a presence of a mobile device within a defined region. Example operation 604 represents, in response to the detecting, determining whether an identity associated with the mobile device is trusted, comprising accessing an identity data store. Example operation 606 represents, in response to determining that the identity associated with the mobile device is not trusted, triggering an alert.

The defined region can be within an interior of a building.

The defined region can correspond to an area that is based on a property line.

The defined region can be a first defined region corresponding to a first condition, and further operations can include modifying the defined region to a second defined region corresponding to a second condition.

The first condition can include at least one of: a first time of day, or presence of a trusted identity within the first defined region, and wherein the second condition includes at least one of: a second time of day, or absence of the trusted identity within the first defined region.

The millimeter wave-based position sensing can generate horizontal positioning data and vertical positioning data, and the defined region can include a three-dimensional region.

Detecting the presence of the mobile device within the defined region can include detecting motion of the mobile device within the defined region.

Triggering the alert can include outputting a notification to a network device of a user associated with the defined region.

Triggering the alert can include outputting a notification. Outputting the notification can include outputting a first notification to a first entity, and further operations can include awaiting a communication from the first entity, and, in response to not receiving the communication from the first entity within a defined time, outputting a second notification to a second entity.

Triggering the alert can include at least one of: sounding an audible alarm or notifying a law enforcement authority via a device associated with the law enforcement authority.

Triggering the alert can include communicating with a security system.

Triggering the alert can include triggering a first alert based on a first location of the mobile device within the defined region, and further operations can include triggering a second alert based on a second location of the mobile device within the defined region.

Figure 7:
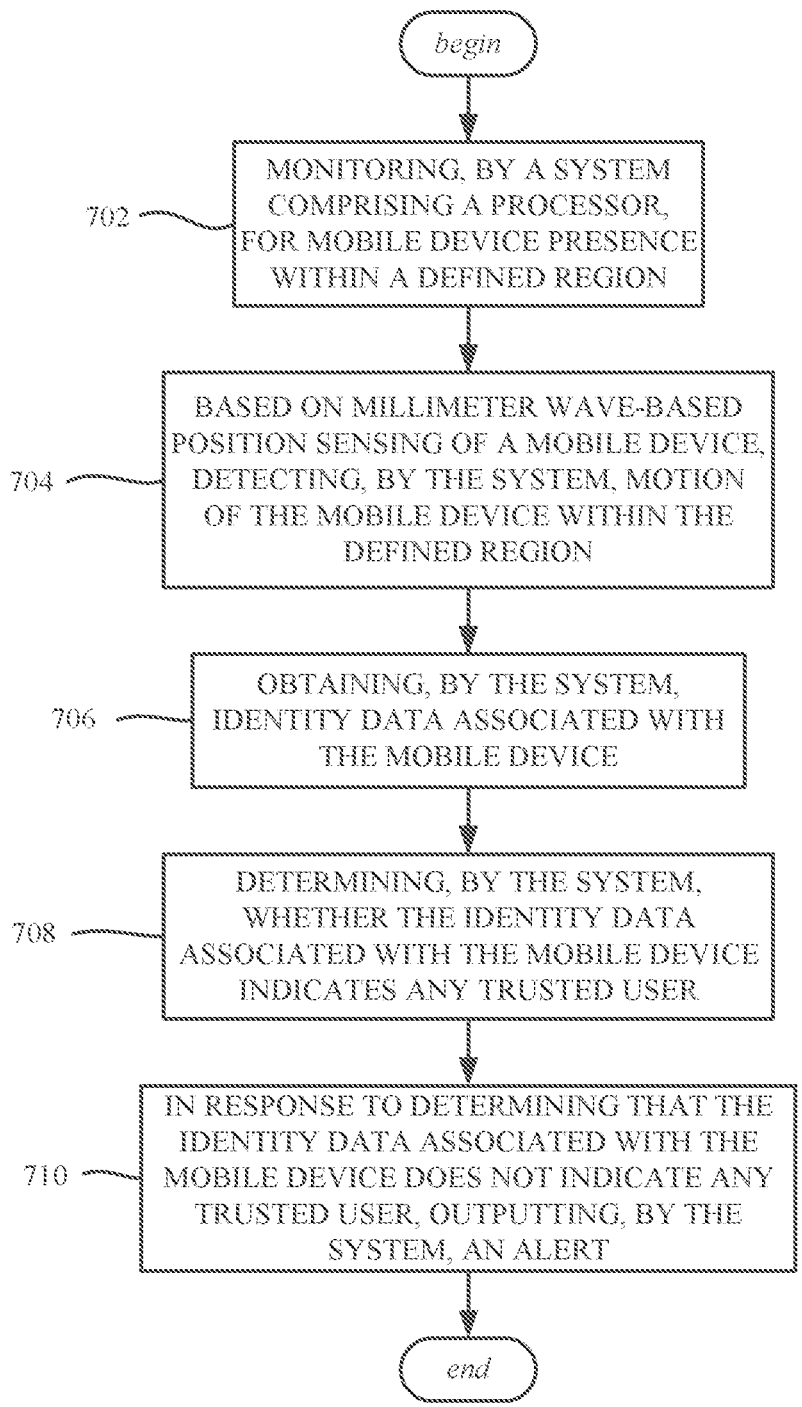
FIG. 7 illustrates example operations related to monitoring a region to detect motion of a mobile device, obtaining identity data associated with the mobile device, and outputting an alert when the identity data does not indicate a trusted user, in accordance with various aspects and embodiments of the subject disclosure.

One or more example aspects are represented in FIG. 7, and can correspond to example operations, e.g., of a method. Operation 702 represents monitoring, by a system including a processor, for mobile device presence within a defined region. Operation 704 represents, based on millimeter wave-based position sensing of a mobile device, detecting, by the system, motion of the mobile device within the defined region. Operation 706 represents obtaining, by the system, identity data associated with the mobile device. Operation 708 represents determining, by the system, whether the identity data associated with the mobile device indicates any trusted user. Operation 710 represents, in response to determining that the identity data associated with the mobile device does not indicate any trusted user, outputting, by the system, an alert.

The alert can include a first alert that triggers a timer; further operations can include determining, by the system based on the timer, whether the mobile device is within at least part of the defined region for a defined duration, and, in response to determining that the mobile device is within at least the part of the defined region for the defined duration, outputting a second alert.

The defined region can be a first defined region corresponding to a first condition; further operations can include modifying, by the system, the defined region to a second defined region corresponding to a second condition.

Outputting the alert can include at least one of: outputting a notification, sounding an audible alarm, sending a communication to a law enforcement authority, or communicating with a security system.

Figure 8:
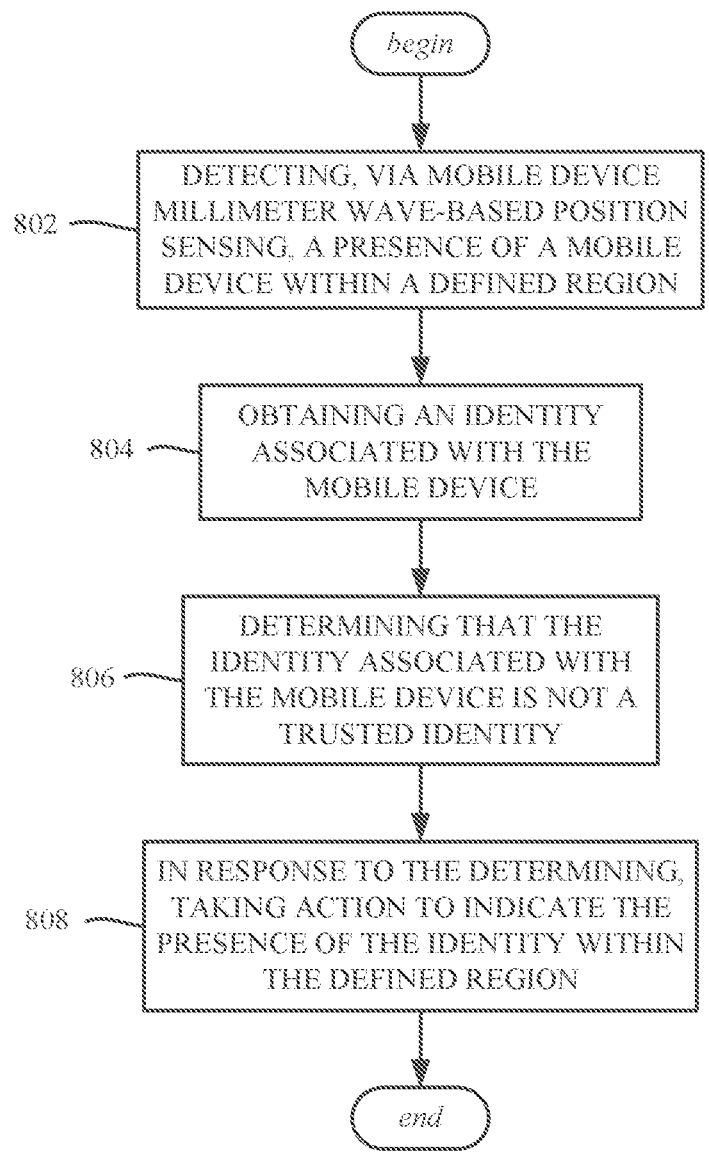
FIG. 8 illustrates example operations related to taking action in response to determining that an identity associated with a mobile device detected within a region is not trusted, in accordance with various aspects and embodiments of the subject disclosure.

One or more aspects are represented in FIG. 8, such as implemented in a machine-readable medium, including executable instructions that, when executed by a processor, facilitate performance of operations. Example operation 802 represents detecting, via mobile device millimeter wave-based position sensing, a presence of a mobile device within a defined region. Example operation 804 represents obtaining an identity associated with the mobile device. Example operation 806 represents determining that the identity associated with the mobile device is not a trusted identity. Example operation 808 represents, in response to the determining, taking action to indicate the presence of the identity within the defined region.

Taking the action can include sending an alert to a communications device of a user authorized to be within the defined region.

Taking the action can include outputting a first notification, and further operations can include determining that the mobile device has moved from a first location within the defined region to a second location within the defined region, and, in response to the determining that the mobile device has moved from the first location to the second location, outputting a second notification.

As can be seen, the technology described herein facilitates enhancements to security system concepts by leveraging the very accurate location information that is to be provided in upcoming and future wireless network features. For example, described is an application program that can process the location data of other mobile devices within a defined region to itself act as a security system, or can couple to an existing security system for further security, e.g., a security system coupled to a commercially available service with even more intelligence to take actions in the case of an intruder).

In this way, location and/or motion detection in association with identity information can be used to take security-related actions, including sounding an alarm to scare off intruders, notify the registered user of events, directly contact authorities, and the like. Such detection also can be used by law enforcement; for example, connecting to a national database with criminal identity data can trigger an automatic report to law enforcement on the mobile device location and criminal identity of a wanted suspect.

Turning to aspects in general, a wireless communication system can employ various cellular systems, technologies, and modulation schemes to facilitate wireless radio communications between devices (e.g., a user equipment/UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 9:
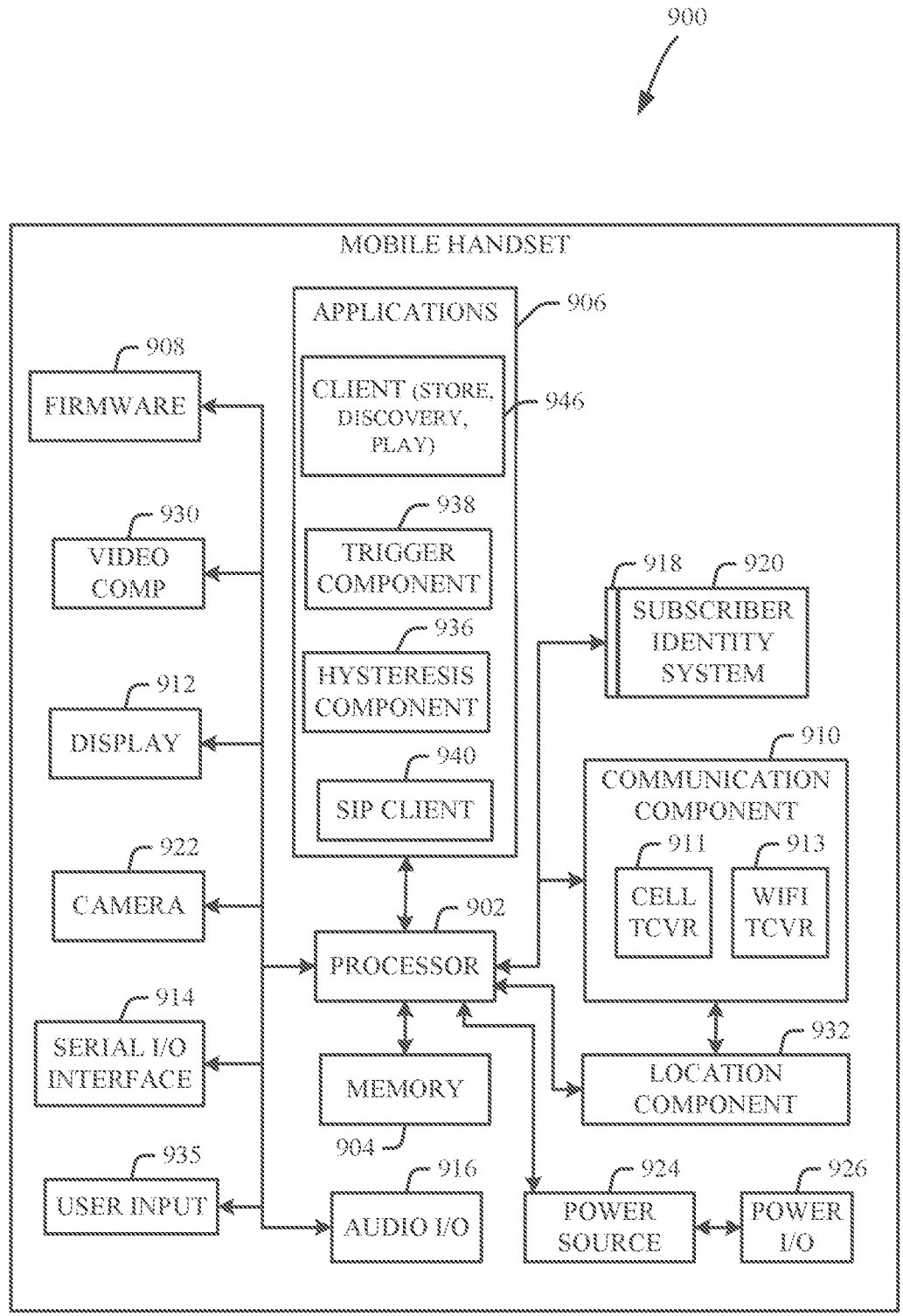
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
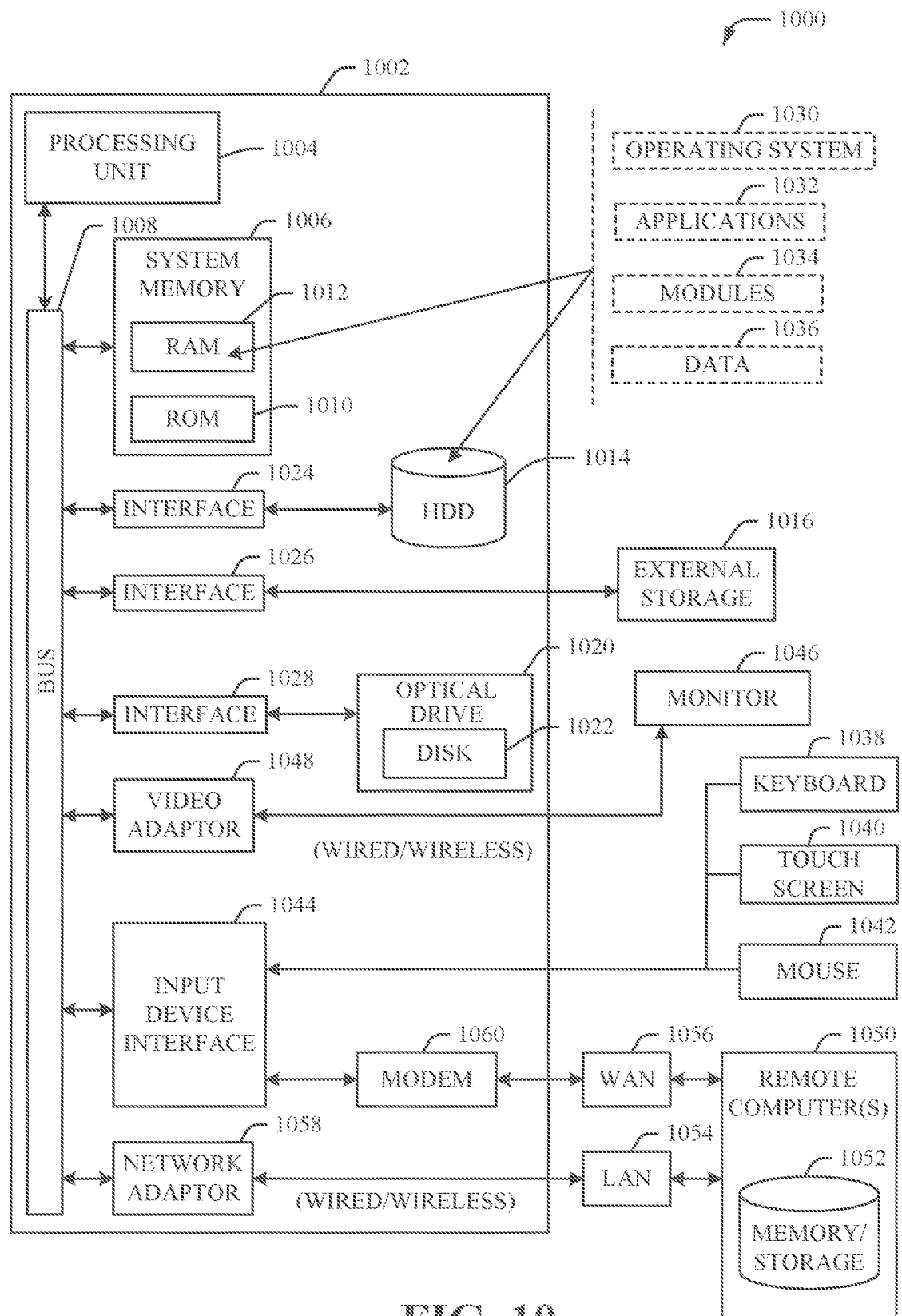
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor of the system, facilitate performance of operations, the operations comprising:
      detecting, via mobile device millimeter wave-based position sensing, a presence of a mobile device within a defined region;
      in response to the detecting, determining whether an identity associated with the mobile device is trusted, comprising accessing an identity data store; and
      in response to determining that the identity associated with the mobile device is not trusted, triggering an alert.

2. The system of claim 1, wherein the defined region is within an interior of a building.

3. The system of claim 1, wherein the defined region corresponds to an area that is based on a property line.

4. The system of claim 1, wherein the defined region is a first defined region corresponding to a first condition, and wherein the operations further comprise modifying the defined region to a second defined region corresponding to a second condition.

5. The system of claim 4, wherein the first condition comprises at least one of: a first time of day, or a presence of a trusted identity within the first defined region, and wherein the second condition comprises at least one of: a second time of day, or an absence of the trusted identity within the first defined region.

6. The system of claim 1, wherein the mobile device millimeter wave-based position sensing generates horizontal positioning data and vertical positioning data, and wherein the defined region comprises a three-dimensional region.

7. The system of claim 1, wherein the detecting the presence of the mobile device within the defined region comprises detecting motion of the mobile device within the defined region.

8. The system of claim 1, wherein the triggering the alert comprises outputting a notification to a network device of a user associated with the defined region.

9. The system of claim 1, wherein the triggering the alert comprises outputting a notification.

10. The system of claim 9, wherein the outputting the notification comprises outputting a first notification to a first entity, and wherein the operations further comprise awaiting a communication from the first entity, and, in response to not receiving the communication from the first entity within a defined time, outputting a second notification to a second entity.

11. The system of claim 1, wherein the triggering the alert comprises at least one of: sounding an audible alarm or notifying a law enforcement authority via a device associated with the law enforcement authority.

12. The system of claim 1, wherein the triggering the alert comprises communicating with a security system.

13. The system of claim 1, wherein the triggering the alert comprises triggering a first alert based on a first location of the mobile device within the defined region, and wherein the operations further comprise triggering a second alert based on a second location of the mobile device within the defined region.

14. A method, comprising:
   monitoring, by a system comprising a processor, for a mobile device presence within a defined region;
   based on millimeter wave-based position sensing of a mobile device, detecting, by the system, motion of the mobile device within the defined region;
   obtaining, by the system, identity data associated with the mobile device;
   determining, by the system, whether the identity data associated with the mobile device indicates any trusted user; and
   in response to determining that the identity data associated with the mobile device does not indicate any trusted user, outputting, by the system, an alert.

15. The method of claim 14, wherein the alert comprises a first alert that triggers a timer, and further comprising determining, by the system based on the timer, whether the mobile device is within at least a part of the defined region for a defined duration, and, in response to determining that the mobile device is within at least the part of the defined region for the defined duration, outputting a second alert.

16. The method of claim 14, wherein the defined region is a first defined region corresponding to a first condition, and further comprising modifying, by the system, the defined region to a second defined region corresponding to a second condition.

17. The method of claim 14, wherein the outputting the alert comprises at least one of: outputting a notification, sounding an audible alarm, sending a communication to a law enforcement authority, or communicating with a security system.

18. A non-transitory machine-readable medium, comprising executable instructions that, when executed by a processor, facilitate performance of operations, the operations comprising:
   detecting, via mobile device millimeter wave-based position sensing, a presence of a mobile device within a defined region;
   obtaining an identity associated with the mobile device;
   determining that the identity associated with the mobile device is not a trusted identity; and
   in response to the determining, taking an action to indicate the presence of the mobile device within the defined region.

19. The non-transitory machine-readable medium of claim 18, wherein the taking the action comprises sending an alert to a communications device of a user authorized to be within the defined region.

20. The non-transitory machine-readable medium of claim 19, wherein the taking the action comprises outputting a first notification, and wherein the operations further comprise determining that the mobile device has moved from a first location within the defined region to a second location within the defined region, and, in response to the determining that the mobile device has moved from the first location to the second location, outputting a second notification.

* * * * *